United States Patent
Ziegler et al.

(10) Patent No.: US 11,773,999 B2
(45) Date of Patent: Oct. 3, 2023

(54) FLUID VALVE HAVING A COATING CONTAINING GOLD AND/OR PLATINUM

(71) Applicant: Agilent Technologies, Inc., Santa Clara, CA (US)

(72) Inventors: Tony Ziegler, Steinfeld (DE); Darijo Zeko, Ettlingen (DE); Thomas Ortmann, Straubenhardt/Ottenhausen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 429 days.

(21) Appl. No.: 16/480,600

(22) PCT Filed: Jan. 23, 2018

(86) PCT No.: PCT/IB2018/050393
§ 371 (c)(1),
(2) Date: Jul. 24, 2019

(87) PCT Pub. No.: WO2018/138626
PCT Pub. Date: Aug. 2, 2018

(65) Prior Publication Data
US 2019/0390788 A1    Dec. 26, 2019

(30) Foreign Application Priority Data
Jan. 27, 2017   (DE) .................... 10 2017 101 629.5

(51) Int. Cl.
*F16K 3/04*     (2006.01)
*F16K 25/00*    (2006.01)
(Continued)

(52) U.S. Cl.
CPC .............. *F16K 25/005* (2013.01); *F16K 3/04* (2013.01); *F16K 11/0743* (2013.01); *G01N 30/20* (2013.01); *G01N 2030/201* (2013.01)

(58) Field of Classification Search
CPC ....... F16K 3/04; F16K 11/0743; G01N 30/20; G01N 2030/201
See application file for complete search history.

(56) References Cited

U.S. PATENT DOCUMENTS 3,203,249  A  *  8/1965  Jentzsch  ................. G01N 30/40
                                                   137/625.21
3,554,486  A     1/1971  Thebado
(Continued)

FOREIGN PATENT DOCUMENTS

| CN | 101446361 A | 6/2009 |
| CN | 101986152 B | 5/2012 |

(Continued)

OTHER PUBLICATIONS

German-language International Search Report and Written Opinion issued in counterpad PCT Application No. PCT/IB2018/050393 dated Apr. 20, 2018, with English translation (sixteen (16) pages).

*Primary Examiner* — Matthew W Jellett
*Assistant Examiner* — Christopher D Ballman

(57) ABSTRACT

A fluid valve for a sample separation apparatus includes a first valve component and a second valve component, which are adjacent to one another and movable relative to one another. The valve components are configured such that, in at least one switching state, at least one switchable fluid channel is formed between the valve components, and at least one part of a surface of at least one of the first valve component and the second valve component is provided with a coating containing gold and/or platinum.

20 Claims, 4 Drawing Sheets

(51) Int. Cl.
*F16K 11/074* (2006.01)
*G01N 30/20* (2006.01)

(56) References Cited

U.S. PATENT DOCUMENTS

| | | | | |
|---|---|---|---|---|
| 3,747,630 A | * | 7/1973 | Hurrell | F16K 11/074 137/312 |
| 3,868,970 A | * | 3/1975 | Ayers | F16K 11/074 137/625.46 |
| 4,044,993 A | | 8/1977 | Wheeler | |
| 4,059,009 A | * | 11/1977 | Ball | G01N 30/20 73/864.83 |
| 4,068,528 A | * | 1/1978 | Gundelfinger | G01N 30/20 73/864.84 |
| 4,243,071 A | | 1/1981 | Shackelford | |
| 4,282,897 A | | 8/1981 | Mey | |
| 4,444,066 A | * | 4/1984 | Ogle | G01N 30/20 73/61.56 |
| 6,098,655 A | | 8/2000 | Bloch et al. | |
| 6,412,751 B1 | | 7/2002 | Wang | |
| 6,672,336 B2 | * | 1/2004 | Nichols | F16K 11/074 137/625.11 |
| 7,028,705 B1 | | 4/2006 | Krechmery et al. | |
| 7,063,302 B2 | * | 6/2006 | Cordill | G01N 30/20 137/247 |
| 7,503,203 B2 | * | 3/2009 | Gamache | F16K 11/074 137/51 |
| 8,322,197 B2 | * | 12/2012 | Koster | G01N 30/20 73/61.55 |
| 8,876,081 B2 | | 11/2014 | Tower | |
| 9,176,101 B2 | * | 11/2015 | Moeller | F16K 11/0743 |
| 2009/0320925 A1 | | 12/2009 | Nichols | |
| 2010/0171055 A1 | | 7/2010 | Dourdeville | |
| 2010/0281959 A1 | | 11/2010 | Berndt | |
| 2013/0284959 A1 | | 10/2013 | Hochgraeber et al. | |

FOREIGN PATENT DOCUMENTS

| | | |
|---|---|---|
| CN | 102699516 A | 10/2012 |
| CN | 102472400 B | 11/2013 |
| CN | 103574098 A | 2/2014 |
| CN | 103314289 B | 3/2015 |
| CN | 105026810 A | 11/2015 |
| DE | 1957309 A1 | 5/1970 |
| DE | 6610019 U | 1/1973 |
| DE | 69110209 T2 | 3/1996 |
| DE | 102016108101 A1 | 12/2016 |
| EP | 0469913 A1 | 2/1992 |
| EP | 0309596 B1 | 3/1993 |
| EP | 0923727 A1 | 6/1999 |
| EP | 1058522 A1 | 12/2000 |
| EP | 0923727 B1 | 12/2002 |
| EP | 1420197 A1 | 5/2004 |
| EP | 1715348 A1 | 10/2006 |
| EP | 1197693 B1 | 11/2006 |
| WO | 9811431 A1 | 3/1998 |
| WO | 2008106613 A2 | 9/2008 |
| WO | 2016156152 A1 | 10/2016 |

* cited by examiner

FLUID VALVE HAVING A COATING CONTAINING GOLD AND/OR PLATINUM

RELATED APPLICATIONS

This application is the national stage under 35 U.S.C. 371 of International Application No. PCT/IB2018/050393, filed Jan. 23, 2018, which claims priority to German Application No. DE 10 2017 101 629.5, filed Jan. 27, 2017, the entire contents of both of which are incorporated by reference herein.

TECHNICAL BACKGROUND

The present invention relates to a fluid valve, to a sample separation apparatus and to a method for producing a fluid valve.

In a high-performance liquid chromatography (HPLC) system, it is typically the case that a liquid (mobile phase) is moved with a very accurately controlled flow rate (for example in the range of microliters to milliliters per minute) and with a very high pressure (typically 20 to 1000 bar and above, at present up to 2000 bar), at which the compressibility of the liquid is noticeable, through a so-called stationary phase (for example in a chromatographic column) in order to separate individual components of a sample liquid that is introduced into the mobile phase from one another. Such an HPLC system is known for example from EP 0,309,596 B1 from the same applicant, Agilent Technologies, Inc.

An HPLC system of said type commonly has one or more fluid valves. In particular in the presence of high pressures, reliable fluidic sealing is a challenge, and the demands on the components of the fluid valve are high.

SUMMARY

It is an object of the invention to permit switching of a fluid valve in a sample separation apparatus with a high degree of leak-tightness and a low level of wear.

In one exemplary embodiment of the present invention, a fluid valve (that is to say a valve for controlling fluid, wherein a fluid may be a gas and/or a liquid, optionally comprising solid particles) for a sample separation apparatus (for example a liquid chromatography apparatus) is provided, wherein the fluid valve comprises a first valve component (in particular with a contact face, furthermore in particular a contact face with respect to a second valve component, wherein the first valve component may for example be formed as a rotor device) and a second valve component (in particular with a contact face, furthermore in particular a contact face with respect to the first valve component, wherein the second valve component may for example be formed as a stator device), wherein the first valve component and the second valve component are adjacent to one another (in particular at the contact faces), are movable (for example rotatable or longitudinally displaceable) relative to one another, and are configured such that, in at least one switching state, at least one switchable fluid channel (switchable in particular by means of a relative movement of the valve components with respect to one another) is formed between said valve components, and wherein at least one part of a (in particular outer and/or inner) surface (in particular of the contact face) of at least one of the first valve component and the second valve component is provided with a coating containing gold and/or platinum.

In another exemplary embodiment, a sample separation apparatus for separating a fluidic sample (in particular into different fractions which may differ with regard to at least one separation characteristic) is provided, wherein the sample separation apparatus comprises a fluid valve with the features described above.

In yet another exemplary embodiment, a method for producing a fluid valve for a sample separation apparatus is provided, wherein, in the method, a first valve component and a second valve component are provided such that these are adjacent to one another and are movable relative to one another, the first valve component and the second valve component are formed such that, in at least one switching state, at least one switchable fluid channel is formed between said valve components, and at least one part of a surface of at least one of the first valve component and the second valve component is provided with a coating containing gold and/or platinum.

In one exemplary embodiment of the invention, a fluid valve is provided in which at least one part of a surface of at least one of two valve components which are movable relative to one another is provided with a coating which contains gold or which comprises gold. It has surprisingly been found that such a surface containing gold on a contact face between the valve components provides lubrication between the valve components which face one another and which slide on one another during a switching process, such that, with the provision of a coating containing gold, only very little wear is to be expected between the valve components even in long-term operation. Such a fluid valve therefore has a long service life. Synergistically with the described lubrication effect, a coating containing gold on the one or more contact faces also ensures that, during a switching process, a certain compensation capability between the valve components is provided. Depending on the degree of hardness, the gold coating is capable of compensating locally high forces caused for example in the event of slight misalignment, generated owing to tolerances or otherwise, between the valve components, by virtue of the gold material clearly yielding to the load. On the contact face, the service life of the fluid valve is additionally increased by this additional function of the coating containing gold. The gold coating is advantageously furthermore biocompatible, that is to say interacts very little, or does not interact in an undesired manner, with a fluid (in particular a liquid such as a solvent or a biological sample) which, during the switching of the fluid valve, may flow through the at least one fluid channel formed between the valve components. In this way, a coating containing gold of a surface of fluid structures/microstructures prevents undesired effects such as corrosion, increased sample adhesion, the formation of undesired chemical reaction products or undesired changes to the fluid processed using the fluid valve, an undesired change of the fluid processed using the fluid valve, etc. In the case of the coating of a valve component which itself is of multi-component form and which is constructed from multiple bonded elements or bodies (for example a rotor device which is constructed from multiple rotor elements bonded together), the coating containing gold on one or both opposite bonding services promotes the strength of the integral bonding. In this way, intrinsic cohesion of the corresponding valve component can be reliably ensured.

As an alternative or in addition to gold, platinum is also a high-performance material for the coating of the respective surface. In particular, platinum exhibits pronounced biocompatibility and may also provide the advantages described above for gold in a similar or corresponding manner.

In exemplary embodiments of the invention, the layer containing gold or the gold layer, in particular hard gold layer, may be applied to numerous materials. For example, this is also possible on an underlying layer of copper. This makes it possible for the ductile characteristics (in particular deformability) or the very good thermal conductivity of said material to be utilized.

Another, likewise biocompatible embodiment of a valve component (that is to say of a rotor or of a stator) is a platinum coating. This may likewise be deposited galvanically (that is to say non-selectively). Owing to the acidic platinum bath, the substrate (for example a valve component) should be configured to withstand this acid attack. In this regard, in the case of very many substrates, pre-gold plating prior to the application of the coating containing platinum, or platinum coating, is advantageous. Alternatively, such a platinum layer may be applied by means of a (in particular selective) sputtering process to the surfaces of a substrate (for example of a rotor substrate or of some other valve component). Substrates that can be used are for example metals such as for example copper, steel, palladium or tungsten, glasses (in particular with adhesion promoters) or plastics which melt at relatively high temperatures, such as for example PEEK, or one or more ceramics.

A coating composed of platinum has the particular advantage that undesired adhesion of biomolecules (for example proteins) thereto practically does not occur.

In the context of the present application, the expression "containing gold" is to be understood in particular to mean a material of the coating on a surface which comprises not only insignificant traces of gold. For example, the gold component of the coating may comprise at least 1 percent by weight gold, in particular at least 10 percent by weight gold, furthermore in particular at least 50 percent by weight gold, preferably at least 90 percent by weight gold, in particular preferably at least 99 percent by weight gold (in order to achieve particularly high biocompatibility).

In the context of the present application, the expression "containing platinum" is to be understood in particular to mean a material of the coating on a surface which comprises not only insignificant traces of platinum. For example, the platinum component of the coating may comprise at least 1 percent by weight platinum, in particular at least 10 percent by weight platinum, furthermore in particular at least 50 percent by weight platinum, preferably at least 90 percent by weight platinum, in particular preferably at least 99 percent by weight platinum (in order to achieve particularly high biocompatibility).

In the context of the present invention, the expression "valve component" is to be understood to mean a valve body which can be moved relative to another valve component during a switching process of the fluid valve. In a preferred exemplary embodiment, the two valve components are a rotor device and a stator device of a fluidic valve. It is however alternatively also possible, for example, for the switching of the fluid valve to be effected by means of a longitudinal movement between two interacting valve components.

In the context of the present application, the expression "surface" of a valve component is to be understood in particular to mean an inner and/or outer boundary or contact face of the valve component. Parts of such a surface may be in particular a contact face between the valve components which interact in fluid-tight fashion, and/or an inner bonding surface between bonded individual bodies of a valve component, and/or a surface, which is in fluidic contact, for limiting a fluid channel or a fluid structure of the valve component(s).

Additional refinements of the fluid valve, of the method and of the sample separation apparatus will be described below.

In one embodiment, the first valve component may comprise a contact face as part of the surface and the second valve component may comprise a contact face as part of the surface, wherein the first valve component and the second valve component are adjacent to one another (in particular make contact with one another) at the contact faces. In the context of the present application, the expression "contact face" of a valve component is to be understood in particular to mean a boundary or contact face of the valve component with respect to another valve component which interacts with said valve component, at which boundary or contact face a fluid-tight interface is formed between the valve components. Simultaneously, the at least one fluid channel that is formed between the valve components in at least one switching state of the fluid valve may run through said boundary or contact face.

In one embodiment, at least one part of the contact face of at least one of the first valve component and the second valve component may be provided with the coating containing gold. A coating containing gold and/or platinum over at least one such contact face promotes lubrication and compensation of the valve components and ensures operation with little wear (tribologically optimized).

In one embodiment, the coating may be formed on at least one entire one of the two contact faces between the first valve component and the second valve component. By virtue of an entire contact face between the two valve components of the fluid valve comprising a coating containing gold and/or platinum in continuous form, which may be provided entirely by one of the two valve components or in continuous form by both valve components, it is ensured that a abrasion-promoting or wear-promoting tribological material configuration cannot arise at any point in the contact region between the valve components.

In one embodiment, the coating may be formed on the contact face of the first valve component and on the contact face of the second valve component. If both contact faces, which face one another and which interact tribologically, of the two valve components are provided entirely or partially with a coating containing gold and/or platinum, the described effects with regard to lubrication, compensation capability and biocompatibility are particularly pronounced.

In one embodiment, situated opposite the contact face of at least one of the first valve component and the second valve component, as another part of the surface, there may be a counterpart face with at least one fluid structure with a further part of the surface. The contact face and counterpart face may be parallel to one another. The structured surface or structure surface may be situated in the interior of a two-component or multi-component valve component, for example at the boundary between two rotor elements of a rotor device which are bonded to one another or possibly merely lie one on top of the other. The fluid structures may be part of the at least one fluid line that can be formed between the valve components. For example, the fluid structures may be grooves and/or fluid connections, the delimiting walls of which form said surface part.

In one embodiment, at least one part of at least one of the fluid structures and/or of the counterpart face may be provided with the coating containing gold and/or platinum. In the case of the fluid structures, this coating can lead to biocompatibility and thus to operation of the fluid valve with a greatly reduced damage, irrespective of the fluid used. In the case of the counterpart face, the coating may promote the connectability (for example by means of bonding) of one valve component to another valve component.

In one embodiment, the counterpart face may be bonded, at the coating, to a covering body. Bonding (or other adjoining) of the covering body (for example a rotor element) to another body of the valve component (for example another rotor element) may be promoted by virtue of the coating containing gold and/or platinum. The compound that is formed can be of chemically particularly stable form owing to the coating containing gold and/or platinum. Retroactive gold plating of the outer surfaces and of the connecting structures is likewise possible if necessary. A retroactive application of platinum is also correspondingly possible.

In one embodiment, at least one part (for example one partial layer of the multi-layer coating) of the coating may comprise or be composed of hard gold. In this context, hard gold may be understood to be an alloy with a main component composed of gold (in particular more than 99 percent by weight), traces of carbon (for example up to 0.7 percent by weight) and an additive (for example nickel and/or cobalt, for example 0.2 to 0.3 percent by weight), which leads to a greater hardness than gold. It has been found that a coating composed of hard gold has particularly advantageous characteristics with regard to lubrication, compensation capability, hardness and biocompatibility. Fluid valves coated in this way at the contact face between the valve components exhibit excellent service life and particularly little wear.

In one embodiment, at least one part (for example a partial layer of a multi-layer coating) of the coating may comprise cobalt in a range between 0.05 percent by weight and 1 percent by weight, in particular in a range between 0.2 percent by weight and 0.3 percent by weight, and the rest gold. The gold component promotes particularly good compensation capability and biocompatibility, wherein the cobalt component gives rise to good lubrication capability and particular hardening of the coating. It is however particularly advantageous if the cobalt component lies within the described value ranges for the cobalt component, most advantageously within the narrower of the two described value ranges for the cobalt component. If the value ranges of the cobalt component are undershot to a great extent, the lubrication capability of the coating is thus reduced. If the value ranges of the cobalt component are overshot to a great extent, there is the risk of the coating no longer satisfying extremely high demands with regard to biocompatibility. The biocompatibility of the coating is promoted by the characteristics of gold, which is inert even with respect to aggressive chemicals and bioliquids.

In one embodiment, the coating containing platinum may be formed particularly advantageously by virtue of a respective surface firstly being pre-gold-plated (that is to say in particular provided with a layer containing gold, for example pure gold), and a layer which comprises platinum or which is composed of platinum subsequently being applied (in particular by sputtering, physical vapor deposition (PVD)). In the case of the coating being realized using platinum, the formation of a double layer, that is to say a layer of a first material directly on one surface and the subsequent application of platinum to said layer, is thus advantageous. It is however also possible for platinum to be applied directly to an underlying surface (for example on the basis of an acidic bath).

In one embodiment, exactly one of the first valve component and of the second valve component may be provided with the coating containing gold and/or platinum, and the other of the first valve component and the second valve component may be provided with another coating composed of a different material. The material of the other coating may have a greater hardness than the material of the coating containing gold and/or platinum. In a particularly preferred exemplary embodiment, the valve components facing one another are coated, on their contact faces, with different materials. It is highly advantageous for one of the two valve components, in particular a rotor device, to be coated with the coating containing gold and/or platinum. The facing contact face of a valve component which is formed preferably as a stator device may, by contrast, be coated with a different material tailored specifically to the requirements thereof, in order to improve the interacting characteristics between the contact faces which face one another. For example, the other material of the other coating may have a greater hardness (and a different roughness) than the material of the coating containing gold and/or platinum. The adaptation of these characteristics may relate to the tribological system (that is to say the running characteristics related to friction surfaces facing one another), to the hardness, the (bio)compatibility, the lubrication capability, the compensation capability of the coating material or, more generally, to the improvement of the lack of wear of the fluid valve.

In one embodiment, the material of the other coating may comprise or be composed of diamond or diamond-like carbon (DLC). It has proven to be particularly advantageous for the first coating to be formed from hard gold with a cobalt component and for the second coating, which differs from the described first coating, to be formed from diamond or DLC. The latter materials exhibit particularly great hardness and reliably reduce abrasion or wear of the valve component coated therewith. With a metallic coating (composed in particular of hard gold), it is possible for a high level of biocompatibility to be achieved, and it is even possible for bioinertness to be achieved with a coating by means of DLC.

In one embodiment, the coating may comprise multiple layers. Such a multi-layer coating is an effective measure for setting the desired characteristics of the coating between the valve components. In particular a double coating, that is to say a coating with exactly two layers composed of different materials, has proven to be a sensible compromise between the outlay in terms of production and the attainable characteristics.

In one embodiment, a first layer directly on a main body of the respective valve component may comprise pure gold, and a second layer on the first coating may comprise hard gold. A pure gold component is to be understood here to mean in particular a component which is composed substantially or entirely of gold. The hard gold component arranged over the latter and on the outer side forms the actual contact face with respect to the facing valve component.

In one embodiment, a main body of the respective valve component, on which main body the coating is arranged, may comprise metal, in particular steel. The main body of the valve components may be selected approximately freely owing to the advantageous characteristics of the coatings. A metallic component, in particular a steel component, furthermore in particular high-grade steel, is a good material selection here with regard to the hardness and manufacturability of the valve component. It is also possible for one of the valve components to be formed from bright steel. Other materials, such as for example a ceramic or the like, are however possible. A metallic valve component, formed in particular from steel, however has the advantage that it can be coated with the layer containing gold and/or platinum in a particularly effective and simple manner. Layered attachments or undesired chemical phenomena at an interface between the metallic valve component and the coating containing gold and/or platinum are advantageously prevented.

In one embodiment, the first valve component and the second valve component may be movable relative to one another in order, in this way, to set at least two different fluid coupling states (for example fluidically coupled and fluidically decoupled) of the at least one fluid channel. For example, in a first fluid coupling state, a fluidic connection through the fluid valve may be made possible. By contrast, in a second fluid coupling state, such a fluidic coupling may be rendered impossible. It is also possible that, in different fluid coupling states, different fluid paths through the valve component are made possible. The individual fluid coupling states can be set by means of the relative movement of the valve components with respect to one another.

In one embodiment, the at least one fluid channel may be formed from at least one groove in the first valve component (for example a rotor device) and at least two fluid connections (for example ports) on the second valve component (for example a stator device), wherein, in different switching states of the fluid valve, the fluid connections can be placed into different fluidic coupling states with respect to the at least one groove. It is advantageously possible for two or more fluid connections to be provided on a stator component of a fluid valve, which fluid connections can be fluidically coupled to other fluidic components (for example via capillaries or hose connections). The actual fluidic connections are then realized by means of one or more switchable grooves, which are preferably provided on a contact face or axially offset with respect to the contact face of a valve component formed as a rotor device. In the corresponding fluid coupling states, the grooves can be selectively placed in fluid connection with, or fluidically decoupled from, particular fluid connections.

In one embodiment, the first valve component may be formed as a rotor device which is rotatable relative to a laboratory system, and the second valve component may be formed as a stator device which is static relative to a laboratory system, which rotor device and stator device are rotatable relative to one another. The embodiment as a rotor valve serves to realize a particularly compact configuration, in the case of which a large number of different fluid coupling states can be set with little outlay. However, a refinement as a displacement valve is alternatively also possible, in the case of which, by means of a longitudinal displacement between the two valve components, different fluid coupling states by means of the one or more fluid channels formed between the valve components are made possible.

In one embodiment, the first valve component may, in the case of an embodiment as a rotor device, comprise a first rotor element and a second rotor element, which may in particular be bonded to one another. The first rotor element may define at least one part of the at least one fluid line (for example may comprise at least one groove and/or at least one fluidic passage). By contrast, the second rotor element may form a cover of the first rotor element (in particular may be free from elements of the fluid line, and may for example, by covering a groove of the first rotor element, form a circumferentially closed, capillary-like line portion). The formation of a rotor component (and/or of a stator component) from two (or more) individual bodies which are connected to one another has proven to be particularly advantageous. In this way, fluidic channels even in the interior of a rotor device can be formed with little outlay in one of the two rotor elements before the two rotor elements are bonded to one another in order to form a then single-piece rotor device. Such bonding joins the rotor elements to one another such that these are subsequently fused together (for example by ultrasound and/or thermocompression bonding) in the boundary region. In this way, even complex fluidic structures can be formed in the interior of a rotor component without the associated outlay in terms of fluidic technology becoming unduly great.

In one embodiment, the first rotor element may comprise, as at least one part of a first fluid line, a groove (running for example in a plane perpendicular to an axis of rotation) on one of the two opposite main surfaces and, as at least one part of a second fluid line, at least one passage (running for example parallel to an axis of rotation) through the first rotor element and a groove (running for example in a plane perpendicular to an axis of rotation), fluidically coupled to said passage, on the other of the two opposite main surfaces. Two grooves which are formed in mutually opposite main surfaces and which are connected to one another by means of one or more passages running perpendicular to said main surfaces (the passages may alternatively also be drilled obliquely) give rise to a high level of fluidic performance of a rotor device thus formed. In particular, it is thus possible for undesired fluidic overlaps during the switching of a fluid valve to be avoided, for example if it is the intention for a groove extending in a radial direction not to be placed in undesired fluidic connection with grooves extending for example in a tangential direction. It is then clearly possible, by means of the described refinement of the rotor device, for one of the two grooves to be relocated into another plane, and it is thus clearly possible for the other groove, which is not to be placed in fluidic connection therewith, to be fluidically tunneled under. In this way, it is possible (for example in two or more planes) for even complex fluidic structures to be integrated in a compact fluid valve.

In another embodiment, the first valve component may comprise, as at least one part of a first fluid channel, a groove on a main surface, facing toward the second valve component, and, as at least one part of a second fluid channel, at least one passage through at least one part of the first valve component and a line portion fluidically coupled to said passage. In particular, the groove on one side and the line portion on the other side may extend over different radial regions of the first valve component.

In one embodiment, the fluid valve may comprise a leak-sealing element which, for fluidic low-pressure sealing and for the control discharge of leakage, is arranged between the first valve component and the second valve component. In particular, the sealing element may be a sealing ring. Such a sealing element may further enhance the fluidic leak-tightness between the two valve components. Even though the coating containing gold and/or platinum also already contributes, owing to its intrinsic characteristics, to the leak-tightness of the at least one fluid channel between the two valve components, freedom from leakage even for high-pressure applications (for example in the case of an HPLC) by means of an additional sealing element can be further improved. Such a sealing element may for example be a sealing ring which can be arranged in a groove of one of the two valve components and which, after the connection (for example pressing-together) of the two valve components, presses in fluid-tight fashion against the opposite contact face of the other valve component.

In one embodiment, the sealing element may comprise or be composed of polytetrafluoroethylene (PTFE, Teflon®) or a PTFE-EPDM compound (ethylene-propylene-diene monomer). However, sealing elements composed of other materials (for example perfluoroelastomers, in particular in nano-activated form) are possible.

In one embodiment, at least one of the first valve component and the second valve component may comprise at least one material out of a group comprising a metal, a plastic (in particular with filler particles or without filler particles), and a ceramic. Through the corresponding material selection, it is possible to set additional characteristics of the fluid valve, for example mechanical and/or thermal characteristics.

In one embodiment, different fluidic structures may be provided in different diameter regions of the first valve component. In this way, even complex fluidic coupling tasks can be made possible in one compact fluid valve.

In one embodiment, at least one function out of a group comprising a fluidic restriction, a fluidic retarding device for retarding a fluid flow, a temporary storage volume for temporarily storing a predefined fluid quantity (for example in the nanoliter to microliter sample range), and a fluid mixing device may be provided by means of the at least one fluid channel. A fluidic restriction may be provided for example as a constriction between two fluid connections by virtue of a groove with a defined width and depth being formed as the fluid connections. A fluidic retarding device may for example constitute a lengthened fluid channel (for example a non-linear connection) between fluid connections, for example a meandering or spiral-shaped channel design. In a temporary storage volume, it is for example possible for a sample portion to be temporarily confined or subjected there to a fluidic reactor reaction. For this purpose, in the respective fluid channel, a measure may be provided which predestined the fluid channel as a reactor and/or permits a temporary confinement of the temporarily stored or buffered fluid quantity. A fluidic mixing device may for example be formed by multiple channels of different length and/or different diameter which branch off from a fluid connection, such that fluid components flowing through the different channels have different flow speeds, and thus a fluid that is fluidically coupled in to these is mixed as a result. Further or other functions are however possible.

In one embodiment, the coating may be formed on the respective valve component by means of a non-selective or non-specific deposition process. In other words, in the described refinement, it does not need to be ensured that the coating of the respective valve component is formed only on the contact face. This greatly simplifies the production process of the fluid valve, because masking processes and the like (which would be necessary for selectively forming the coating only at selected locations) are not involved. Additionally, the coating of other surface regions of the respective valve component (for example fluid structures such as grooves, fluid connections and/or passages which contribute to the formation of the at least one fluid channel) has the advantage that, then, said surfaces are also provided with bioinert or biocompatible protection. In the case of the coating being formed on the surface, it has thus proven to be particularly simple from a production aspect for an entire exposed surface of the respective valve component (or of a sub-component thereof) to be provided with the coating. This is associated with the fact that such coatings (for example DLC) can be formed using deposition processes (for example chemical vapor deposition (CVD, plasma-assisted CVD (PACVD)) in the case of which the coating is deposited non-specifically on an entire surface. In the case of gold, this is often a galvanic process of a entire exposed surface of a respective valve component. This coating, which is particularly simple from a production aspect, of the entire exposed surface of a respective valve component simultaneously has the effect that all of the technical advantages of the coating (lubrication, compensation capability, bioinertness/biocompatibility, bonding capability etc.) come to bear in different surface regions of a respective valve component. Additional outlay (masking etc.) for restricting the coating to individual surface regions can additionally be omitted.

In one embodiment, at least one part of at least one fluid structure of the first valve component (in particular a rotor device) may be offset in an axial direction with respect to the contact faces, such that, in at least one switching state of the fluid valve, said part and at least one other part of at least one fluid structure of the first valve component and/or of the second valve component (in particular a stator device) at least partially overlap in a view along the axial direction. In such an embodiment, different parts of fluid structures of a rotor device and/or of a stator device of a fluid valve may be formed so as to overlap one another in an axial viewing direction or projection and axially in different planes, without imperatively being fluidically coupled to one another or being undesirably temporarily coupled to one another during a switching process. This may be realized by virtue of the different parts of the fluid structures being guided in different axial planes of the fluid valve but nevertheless so as to be in alignment with one another at least in certain portions in a viewing direction. In this way, it is possible to provide a compact fluid valve with which even complex fluidic structures can be realized in a flexible manner. Owing to the relocation of different parts of the fluid structures into different planes, these may, in a view or in a projection onto the direction of rotation, intersect or cross one another in static (for example if the parts are all integrated in the rotor device) and/or dynamic (for example during rotation of the rotary device relative to a positionally fixed stator device, if the parts are integrated partially in the rotor device and partially in the stator device) fashion without fluid undesirably flowing from one part of the fluid structure(s) into the other part of the fluid structure(s).

In one embodiment, in the at least one state of rotation in which the at least partial overlap occurs, the at least one part and the at least one other part may be fluidically decoupled from one another. Different fluids can thus, in at least the one aforementioned state of rotation, flow independently of one another through the part and through the other part without undesirably interacting with one another. In another embodiment, in the state of rotation in which the at least partial overlap occurs and/or in another state of rotation, the at least one part and the at least one other part may be fluidically coupled to one another in targeted fashion.

In one embodiment, the at least one other part may be formed by at least one fluid connection of the stator device (see for example FIG. 12). A spatially static fluid connection of the stator device can thus be provided at any desired position, in particular even in the case of multiple radii of revolution of the aforementioned structures, without the risk of temporarily undesirably interacting with a groove, channel systems or the like positioned in the interior of the rotor device during the switching of the fluid valve.

In one embodiment, the at least one other part may be formed by multiple fluid connections of the stator device, which are arranged at least on two different radii of the stator device in relation to the axis of rotation. Through the possibility of providing multiple fluid connections at different radii, it is possible for even complex fluidic tasks to be performed by means of a compact fluid valve.

In one embodiment, the at least one part may extend on a first radius to a second radius of the rotor device (in particular in a radial direction), and the at least one other part may be arranged on a third radius which is greater than the first radius and smaller than the second radius. The arrangement of the structures on the corresponding radii may be in relation to the axis of rotation. During the switching of the fluid valve, it is then possible, for example, for the other part, which is formed as a fluid connection, to slide over the fluid structure between the first radius and the second radius, without fluidically interacting with said fluid structure.

In another embodiment, it is also possible for the at least one other part of the at least one fluid structure to belong to the rotor device, and to be offset in the axial direction in relation to the axis of rotation with respect to the at least one part of the at least one fluid structure of the rotor device (see for example FIG. 13). In this refinement, it is possible, in the rotor device, for different fluid structures to be provided on different planes, which fluid structures can be operated independently of one another. These may for example cross one another in a plan view.

In one embodiment, the at least one other part of the at least one fluid structure may be arranged on the contact face of the rotor device, and consequently directly at the interface between rotor device and stator device. In particular, the at least one other part of the at least one fluid structure may be a superficial groove of the rotor device on the contact face thereof. The other part of the corresponding fluid structure can be produced with particularly little outlay in terms of production on the contact face, for example by removal of material from the surface by cutting (for example by milling) so as to form the groove.

In one embodiment, the at least one fluid structure of the rotor device may comprise at least one passage (formed for example as a vertical blind hole or passage hole) through the rotor device from the contact face of the rotor device to the at least one part (which is spatially offset with respect to the contact face). Such a passage may be formed with little outlay for example by drilling (or by etching or by means of the PEM method) a vertical bore into or through the rotor device or a rotor element thereof. Oblique drilling is also possible. Through one or more such passages, a fluidic connection to a fluid structure, which is axially offset with respect to the contact face, of the rotor device can be produced using simple means.

In one embodiment, the at least one passage and the at least one part may form a fluidic bypass for the at least one other part (see for example FIG. 4 or FIG. 5). It is clearly possible for two passages and a groove-like or capillary-like other part to give rise to a configuration in which a fluid structure is tunneled under at the contact face or in another plane of the rotor device.

In one embodiment, two passages and a part which connects said passages may be provided, which together form a substantially U-shaped structure in cross section (see for example FIG. 4 or FIG. 5). Such a U-shape may be formed by two vertical passages and a horizontal connecting part between the two vertical passages, in order to tunnel under another fluid structure.

In one embodiment, the at least one part may be formed by a groove in a first rotor element of the rotor device, which groove is covered by a second rotor element (see for example FIG. 5). The milling of a groove is possible with little outlay in terms of production. If a first rotor element with a groove produced in this way is covered by a second rotor element, which extends for example in continuous fashion, a capillary-like structure can be formed which is circumferentially closed off or delimited.

In one embodiment, the at least one part may extend in a radial direction of the rotor device (see for example FIG. 6). In this way, a fluidic path can advantageously be kept short, without forfeiting the possibility of forming one or more further fluidic structures (in other planes) of the rotor device in a radial intermediate region.

In one embodiment, the separation device may be formed as a chromatographic separation device, in particular as a chromatography separation column. In the case of a chromatographic separation, the chromatography separation column may be provided with an adsorbent. The fluidic sample can be retained on said adsorbent and only subsequently separated again fraction by fraction with sufficient eluent (isocratically) or in the presence of a specific solvent composition (gradient), whereby the separation of the sample into its fractions is realized.

The sample separation apparatus may be a microfluidic measuring apparatus, a life science apparatus, a liquid chromatography apparatus, an HPLC (High Performance Liquid Chromatography) system, a UHPLC (Ultra High Performance Liquid Chromatography) system, an SFC (Supercritical Fluid Chromatography) apparatus, a gas chromatography apparatus, an electrochromatography apparatus and/or a gel electrophoresis apparatus. Numerous other applications are however possible.

The fluid pump may for example be configured to convey the mobile phase at a high pressure, for example several 100 bar up to 1000 bar and higher, through the system.

The sample separation apparatus may comprise a sample injector for introducing the sample into the fluidic separation path. Such a sample injector may comprise an injection needle, which is couplable to a seat, in a corresponding liquid path, wherein the needle can be moved out of said seat in order to take in a sample, wherein, after the needle has been introduced into the seat again, the sample is situated in a fluid path which, for example by means of the switching of a valve, can be switched into the separation path of the system, which leads to the introduction of the sample into the fluidic separation path.

The sample separation apparatus may comprise a fraction collector for collecting the separated components. Such a fraction collector may conduct the various components into different liquid vessels, for example. The analyzed sample may however also be fed to an outflow vessel.

The sample separation apparatus may preferably comprise a detector for detecting the separated components. Such a detector may generate a signal which can be observed and/or recorded and which is indicative of the presence and quantity of the sample components in the fluid flowing through the system.

BRIEF DESCRIPTION OF THE FIGURES

Other objects and many of the accompanying advantages of embodiments of the present invention will become readily apparent and better understandable with reference to the following, more detailed description of embodiments in conjunction with the appended drawings. Features which are substantially or functionally identical or similar are denoted by the same reference designations.

Figure 1:
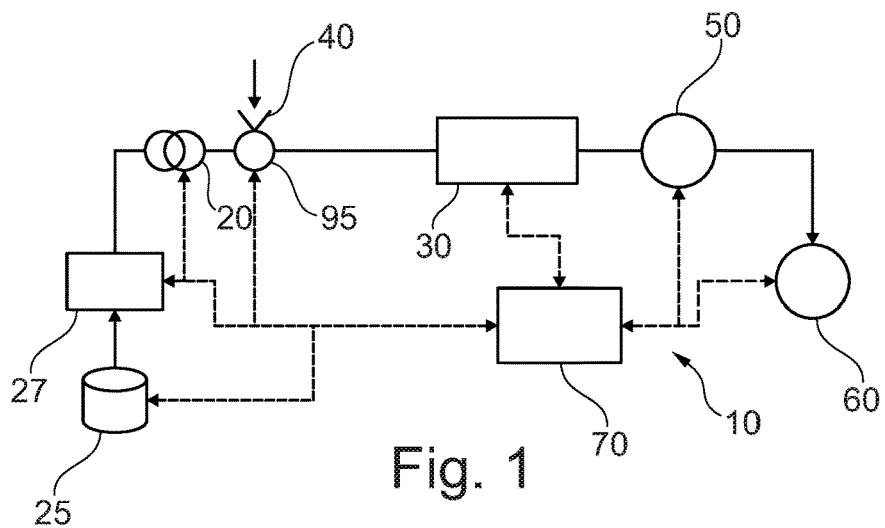
FIG. 1 shows an HPLC system according to an exemplary embodiment of the invention.

The illustration in the drawings is schematic.

Before exemplary embodiments will be described with reference to the figures, a number of basic considerations shall be summarized, on the basis of which exemplary embodiments of the invention have been derived.

According to a first aspect of an embodiment of the invention, at least one part of a surface (in particular at a contact face between interacting valve components, at a bonding face between individual bodies of a valve component, at a fluid structure of a valve component, etc.) of a valve component (in particular a stator device or a rotor device) is provided with a coating containing gold and/or platinum. This leads to lubrication (in particular Au—Co lubrication in the case of hard gold) and compensation capability at the contact face, biocompatibility of the fluid structures, mechanical robustness of the fluid valve and bonding capability of individual elements of a valve component.

According to another aspect of an embodiment of the invention, fluid structures of a valve component (in particular of a rotor device or of a stator device) are guided in multiple planes (in particular at a contact face and in the interior) of a valve component. In this way, the density of fluid structures in a fluid valve can be increased, the complexity and the number of functions can be increased, and thus the compactness of the system can be improved. At the same time, this leads to a shortening of the fluid paths and thus to a small dead volume of the fluid valve.

In one exemplary embodiment of the invention, a fluid valve is provided which is formed preferably as a rotor valve or shear valve. It is furthermore preferable for a surface portion, in particular of the rotor component, of a rotor valve of said type to be provided with a gold plating. If the coating containing gold is formed from hard gold, this may have a Vickers hardness of 160 HV±20 HV. Another surface region, in particular of the stator component, of a fluid valve of said type may be provided with a DLC (diamond-like carbon) coating. A fluid valve in the following configurations is preferably provided: Teflon® or MoldFlon® on DLC (bioinert), PEEK on DLC (bioinert); gold on DLC, or gold on gold (biocompatible).

Conventional shear valves for HPLC applications are commonly constructed from three core components: a hard stator part, a normally relatively soft rotor part, and one or more springs, in particular spring washers (force unit). In particular in the presence of high fluid pressures (that is to say high contact pressures), these technologies lead, inter alia owing to non-optimal tribological conditions (pairings), either with regard to the soft or (for example in the case of carbon-fiber-filled PEEK on DLC) else of the relatively hard component, to limitations with regard to reliability and sealing action, such that these components must be exchanged relatively frequently. These technologies conventionally make it necessary in particular for the soft component to be exchanged frequently owing to intense wear, because this can give rise to limitations with regard to reliability and sealing action.

By contrast to this, in one exemplary embodiment of the invention, a fluid valve with long service life and low wear is provided. In particular, a shear valve rotor and a shear valve stator are provided, in the case of which a coating procedure and a particular material selection must be performed. In this way, it is possible for gold and/or and DLC coatings is to be provided on contact faces of a rotor component and/or stator component of said type, and, by means of such a coating, to create a fluid valve with a long service life. In particular, the coating of a contact face of one of the valve components is provided with a layer containing gold and/or platinum in order to provide high reliability with regard to pressure stability. Furthermore, such a coating provides technical advantages with regard to the bonding characteristics, the stability over a long service life, and the chemical robustness or bioinertness or biocompatibility, which is highly advantageous in particular for sample separation applications.

In the case of the coating being in the form of a double layer, an inner layer (for example pre-gold) may for example have a thickness in a range between 0.1 μm and 5 μm, in particular between 0.15 μm and 0.5 μm. An outer layer (for example hard gold) may for example have a thickness in a range between 5 μm and 50 μm, in particular in a range between 7 μm and 10 μm. The former layer may be a pure gold layer, whereas the latter layer may be a hard gold layer.

If the two contact faces, which face one another, of the two valve components comprise a coating, the provision of both contact faces with a coating containing gold and/or platinum is advantageous. An alternative advantageous configuration is the provision of a layer containing gold and/or platinum on one of the contact faces, and the coating with a hard coating, composed for example of diamond or DLC, on the other valve component.

A first valve component, which may be formed in particular as a rotor component, may be designed for reducing wear and for providing a high level of fluid leak-tightness, even under high pressure. Such a valve component may also be compatible with solvents such as are used in liquid chromatography. A bioinert or biocompatible characteristic of such a valve component is likewise advantageous. Such a valve component may also give rise to a long service life of a sealing element. In the event of a defect, such a valve component may also permit a suitable discharge of emerging fluid.

With regard to the second valve component, which is preferably formed as a stator component, the described architecture permits the provision of highly flexible fluid connections for capillaries or the like, and the provision of check valves, helical windings, etc.

The formation of a valve component, which is realized preferably as a rotor component, may be realized by virtue of two (or more) rotor elements being produced firstly as separate bodies. A first rotor element may be formed with a groove on a main surface on a front side and with a groove on a main surface on a rear side. Said rotor element may furthermore comprise one or more holes in the form of passages or passage bores, by means of which the front main surface is fluidically coupled to the rear main surface. The other rotor element may be designed to cover and seal off the rear main surface of the first rotor element by means of bonding. It is possible for the surfaces of metallic rotor elements to be coated with gold or with a material containing gold. The two rotor elements (for example metal parts) of the rotor device may then be bonded to one another in order to realize a single-piece rotor device with buried capillaries (formed by the covered groove). The bonding of the two rotor elements to one another may be performed in particular by means of ultrasound and/or thermocompression bonding. In the case of thermobonding, the rotor elements (the surfaces of which have preferably been cleaned and/or activated in advance) are pressed against one another in the presence of an elevated temperature and/or elevated pressure (possibly introduced by means of ultrasound energy), and thus connect to one another to form a single-piece structure. In the case of ultrasound bonding, the formation of a single-piece structure can be promoted through the supply of ultrasound. It is furthermore possible for a sealing element, for example a PTFE sealing ring, to be attached to the rotor component.

Each of the two rotor elements may be produced from one of the materials from the following list: steel with gold coating; polyether ether ketone (PEEK) and/or carbon-fiber-filled PEEK (thermally bondable); ceramic (bondable on both sides); Teflon solid material; Teflon® or MoldFlon® with perfluoroalkoxy polymer (PFA) (bondable on both sides), optionally filled or non-filled (bondable). The filling may be realized with filler particles which increase the wear resistance and/or the pressure stability of the respective valve component or of the respective rotor element.

The formation of the second valve component, which is formed preferably as a stator component, may be produced by means of coating of the inner or exposed surfaces with DLC (diamond-like carbon) or some other hard material. Alternatively, said surface may also be provided with a coating containing gold and/or platinum, similar to that of the rotor component.

With such a fluid valve, wide-ranging compatibility with a wide variety of different solvents (for example organic solvents such as ethanol or inorganic solvents) is achieved. Furthermore, undesired carrying-over of samples between analyses, measurements or other fluid processing steps performed in succession can be prevented with such a valve architecture. A fluid valve with a long service life can be provided. Furthermore, a potential risk of a loss of fluidic sample material is reduced with the described valve configuration. A further advantage of this architecture consists in that, owing to the provision of a sealing element around a high-pressure sealing region, in the event of leakage, a discharge of escaping fluid can be defined and channeled in a precise manner through a channel in the stator device.

The provision of the rotor device composed of two rotor elements, of which one has grooves on opposite main surfaces and has a passage connecting said grooves, has additional advantages. In this way, on a main surface at the rear side of the corresponding rotor element in relation to the stator component, it is possible to realize fluidic functions such as for example restrictions, retarding volumes, fixed volumes for an injection, or superposed functions at different rotor radii by means of a bridge-like decoupling of different fluid channels. In this way, complex fluidic structures with small dimensions can be provided. It is possible to work with fluid connections at different rotor diameters without restrictions with regard to switching performance. The degree of freedom in the development of rotor seals is high.

FIG. 1 shows the basic construction of an HPLC system as an example for a sample separation apparatus 10, such as can be used for example for liquid chromatography. A fluid pump 20 as fluid drive device, which is supplied with solvents from a supply unit 25, drives a mobile phase through a separating device 30 (such as for example a chromatographic column), which contains a stationary phase. A degasser 27 can degas the solvent before this is fed to the fluid pump 20. A sample introduction unit 40 with a switching valve or fluid valve 95 is arranged between the fluid pump 20 and the separation device 30 for the purposes of introducing a sample liquid into the fluidic separation path. The stationary phase of the separation device 30 is provided for separating components of the sample. A detector, see flow cell 50, detects separated components of the sample, and an interposed fractionator may be provided for outputting separated components of the sample into vessels provided for these. Liquids that are no longer required may be output into an outflow vessel 60.

A control unit 70 controls the individual components 20, 25, 27, 30, 40, 50, 60, 95 of the sample separation apparatus 10. Embodiments of the fluid valve 95 in accordance with exemplary embodiments of the invention will be described below with reference to the further figures.

Figure 2:
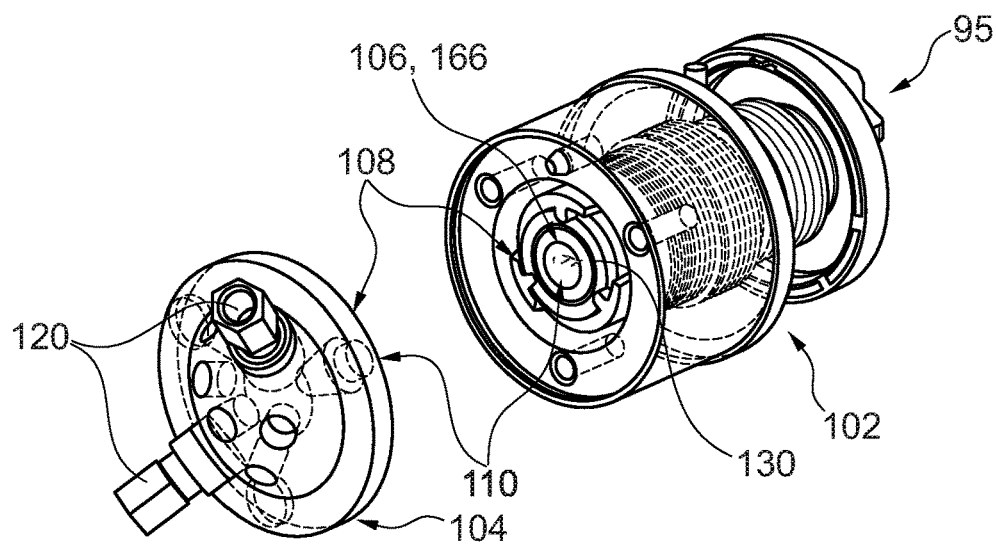
FIG. 2 shows a three-dimensional exploded illustration of a fluid valve according to an exemplary embodiment of the invention.
Figure 3:
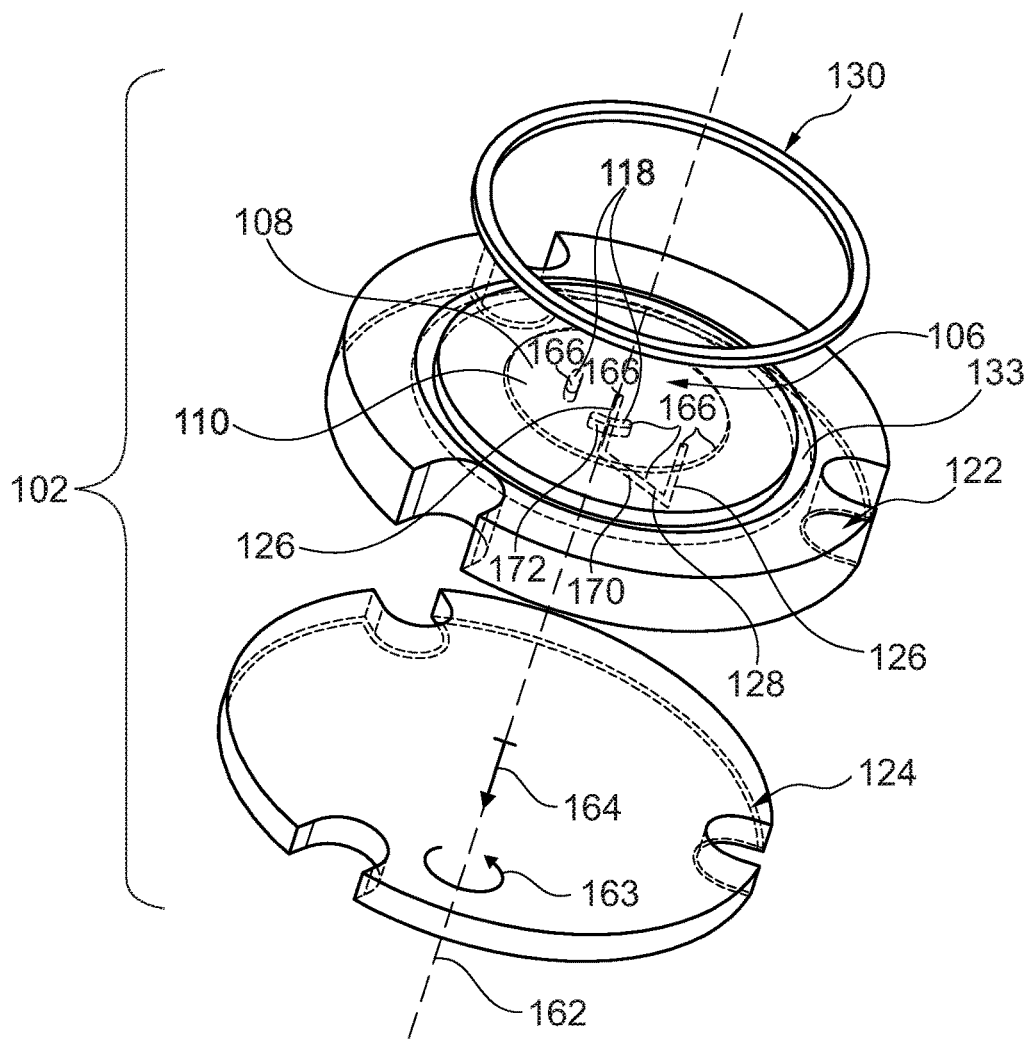
FIG. 3 shows a three-dimensional exploded illustration of a rotor device of the fluid valve as per FIG. 2.

FIG. 2 shows a three-dimensional view of a fluid valve 95 according to an exemplary embodiment of the invention in an exploded illustration. FIG. 3 shows a three-dimensional view of a rotor device 102 of the fluid valve 95 as per FIG. 2 in an exploded illustration.

The fluid valve 95 is for example suitable for use in a sample separation apparatus 10, such as the liquid chromatography apparatus illustrated in FIG. 1. The fluid valve 95 comprises a first valve component, which is formed as a rotor device 102 and the individual parts of which are illustrated in more detail in FIG. 3. The fluid valve 95 furthermore comprises a second valve component, which is formed as a stator device 104 and which interacts with the rotor device 102. The rotatable rotor device 102 and the positionally fixed stator device 104 are movable relative to one another by means of a rotational movement of the rotor device 102, and are configured such that, between them, there are formed one or more switchable fluid channels 106 (only partially shown in FIG. 2). At least one part of a contact face 108 of the rotor device 102 and/or at least one part of a contact face 108 of the stator device 104 is or are preferably provided with a coating 110 containing gold. The contact faces 108 of the rotor device 102 and of the stator device 104 are situated opposite one another and can make contact with one another in high-pressure-fluid-tight fashion during the operation of the fluid valve 95. More specifically, the coating 110 containing gold may be formed from hard gold, which comprises cobalt in a range between 0.2 percent by weight and 0.3 percent by weight, approximately 0.7 percent by weight carbon, and the rest substantially only gold (approximately 99 percent by weight). It is particularly preferable if the coating 110 of the rotor device 102 comprises gold, and the coating 110 of the stator device 104 comprises DLC (diamond-like carbon). This yields good lubrication at the interface (that is to say the contact faces 108) between the valve components 102, 104 as a tribological pair, and consequently operation of the fluid valve 95 with low friction. In the case of slight misalignments between the two valve components 102, 104, the coating 110 ensures a certain compensation capability and thus further lengthens the service life of the fluid valve 95. Furthermore, the hardness of the coating 110 composed of DLC ensures a low level of abrasion and a consequently low level of wear. In the region of the fluid channels 106, the coating 110 creates an at least biocompatible surface which withstands aggressive solvents and biological samples without corrosion or the undesired generation of significant chemical interaction products. If the two rotor elements 122, 124 illustrated in FIG. 3 are joined together by means of bonding to form a single-piece rotor device 102, the coating 110 between the rotor elements 122, 124 promotes the strength at the interfaces thereof. In order for these advantages to be brought to bear with particular effect, and for the sake of simple producibility of the coatings 110 by means of non-selective deposition, the coating 110 may advantageously be formed on an entire surface of the rotor device 102 and/or of the stator device 104.

By means of movement of the rotor device 102 relative to the stator device 104, it is possible to set different fluid coupling states or fluid decoupling states of the at least one fluid channel 106. For example, fluid structures 166 (for example grooves, passages, closed fluid lines etc.) of the rotor device 102 and corresponding fluid structures 168 (not shown in FIG. 2, for example grooves, closed fluid lines, fluid connections etc.) of the stator device 104 can be fluidically coupled to one another or fluidically decoupled from one another in different switching states. As shown in FIG. 2, the stator device 104 comprises fluid connections 120 (also referred to as ports) to which fluid components not illustrated in FIG. 2 (for example injector 40, fluid pump 20, separation device 30, see FIG. 1) can be fluidically connected. This may be realized for example by means of capillary connections and a suitable fitting (not shown). In FIG. 2, an annular sealing element 130 is furthermore inserted into a corresponding annular groove 133 of the rotor device 102.

As shown in FIG. 3, the rotor-side part of the at least one fluid channel 106 may be formed by means of the fluid structures 166 which are formed in the first rotor element 122 and of which a part is delimited by the second rotor element 124 by coverage. For this purpose, the first rotor element 122 may, at its lower main surface in FIG. 3, be bonded to the second rotor element 124, and thus covered by the latter, so as to form the single-piece rotor device 102. The fluid structures 166 comprise (in this case tangential) grooves 118 on an upper main surface in FIG. 3 of the rotor device 102, vertical passages 126 between the two main surfaces, and a (in this case radial) line portion 128. The line portion 128 is formed by a groove in the lower main surface in FIG. 3 of the first rotor element 122, and by a main surface, adjoining said lower main surface in the assembled state, of the second rotor element 124. Ends of the passages 126 and ends of the line portion 128 are fluidically connected to one another or coincide, such that a U-shaped cavity is formed.

Although not illustrated in FIG. 3, the stator-side part of the at least one fluid channel 106 may be formed by at least two fluid connections 120 (see FIG. 2) on the stator device 104. In different switching states of the fluid valve 95, the fluid connections 120 can be placed into different fluid coupling states (that is to say fluidically coupled or fluidically decoupled) with the grooves 118 with the upper ends of the passages 126.

As illustrated in FIG. 3, the rotor device 102 is formed by a disk-shaped first rotor element 122 and a disk-shaped second rotor element 124, which can be joined, so as to form a single-piece body, by means of ultrasound and/or thermo-compression bonding to form the rotor device 102. As can be seen in FIG. 3, the first rotor element 122, which comprises the line portion 128, the grooves 118 and the passages 126 defines a part of the at least one fluid channel 106, whereas the second rotor element 124 forms a covering, which in the exemplary embodiment shown extends in continuous fashion, of the first rotor element 122. The grooves 118, on the one hand, and the line portion 128, on the other hand, extend over different radial and tangential regions and in axially mutually offset planes of the rotor device 102. Since the grooves 118 and the line portion 128 extend in different axial planes of the rotor device 102, these always remain fluidically decoupled, although they may extend over overlapping radial and/or tangential regions. In this way, it is possible to integrate complex fluidic structures in the rotor device 102 in compact fashion. In other words, by means of the described architecture of different cutouts in different axial planes of the rotor device 102, it is possible for different fluidic structures 106 to be formed in different diameter regions of the rotor device 102 in a compact manner and with fluidic decoupling being reliably maintained. In other words, this is realized by virtue of a part 170 of the fluid structures 166 of the rotor device 102 being offset in an axial direction 164, related to an axis of rotation 162, relative to the planar contact face 108. In this way, said part 170 and another part 172 of the fluid structures 166 on the contact face 108 of the rotor device 102 overlap in a view along the axial direction 164. The first valve component, formed as a rotor device 102, can, during switching operation, rotate in a direction of rotation 163 (or in a reverse direction) in order to form different fluidic coupling states with the stator device 104. The part 170 of the fluid structures 166 of the rotor device 102 is situated on the lower main surface in FIG. 3 of the first rotor element 122, whereas the other part 172 of the fluid structures 166 of the rotor device 102 is situated on the upper main surface in FIG. 3 of the first rotor element 122, and therefore directly adjoins the contact face 108 of the stator device 104 of the fluid valve 95.

As can be seen most clearly in FIG. 3, the fluid valve 95 furthermore comprises a leak sealing element 130 which is arranged so as to impart fluidic sealing between the rotor device 102 and the stator device 104. For this purpose, the sealing element 130, which is formed as a leak sealing ring, can be inserted into the annular groove 133 of the rotor device 102. The sealing element 130 may for example be produced from polytetrafluoroethylene (PTFE) or a PTFE and EPDM compound, or some other tribological pairing.

Figure 4:
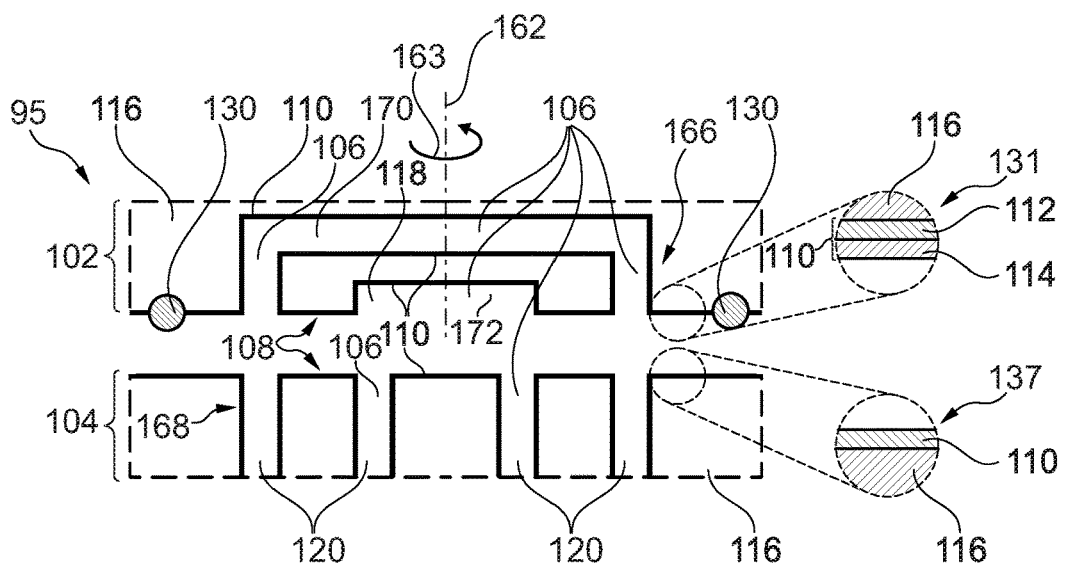
FIG. 4 shows a cross-sectional view of a stator or rotor of a fluid valve according to an exemplary embodiment of the invention.

FIG. 4 shows a cross-sectional view of a fluid valve 95 according to an exemplary embodiment of the invention.

As can be seen from a detail 131 in FIG. 4, the coating 110 of the rotor device 102 (alternatively or additionally of the stator device 104) may comprise multiple layers 112, 114. In FIG. 4, a first layer 112 composed of pure gold is formed directly on a main body 116 (composed of steel) of the rotor device 102. A second layer 114 on the first layer 112 comprises hard gold. By contrast, detail 137 in FIG. 4 shows that the coating 110 of the stator device 104 (alternatively or additionally of the rotor device 102) may be formed as a monolayer on a main body 116 (for example likewise composed of steel). The monolayer may for example comprise hard gold, DLC or diamond. It is possible for one or both valve components 102, 104 to be coated with exactly one or with multiple layers 112, 114, and for said coatings 110 to be identical or different. The combinations hard gold-hard gold and hard gold-DLC are particularly preferred.

FIG. 4 shows that all exposed surfaces of the stator device 104, which forms the second valve component, and of the rotor device 102, which forms the first valve component, are covered with the respective coating 110. In other words, the respective coating 110 is produced by means of a method (for example sputtering, chemical vapor deposition, PACVD, etc.) in the case of which the coating 110 is formed on the respective valve component 102, 104 by means of a non-selective deposition process. This is straightforward in terms of production, because then, the coating can be performed in a single process. A selective coating of only particular surface regions can then be omitted. The coating 110 has advantageous effects not only on the contact faces 108 but also on the surfaces of the fluid structures 166, 168, as described above.

Also shown in FIG. 4 are fluid structures 166, 168, which overlap in a projection onto the vertical axis in said figure, which are axially mutually offset, and which are fluidically decoupled from one another. In this way, the fluid valve 95 in FIG. 4 is compact, flexible in terms of design, exhibits high fluidic performance and permits short fluid paths.

Figure 5:
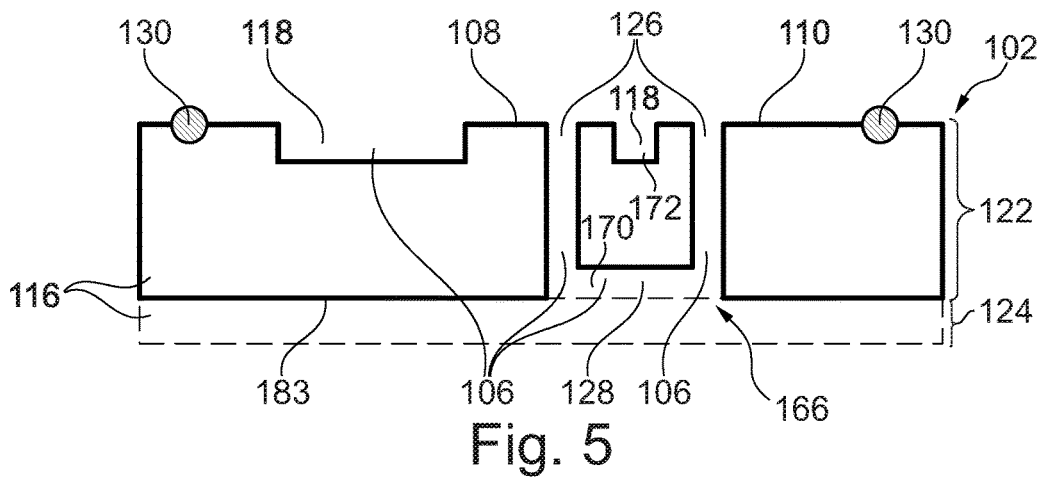
FIG. 5 shows a cross-sectional view of a rotor device of a fluid valve according to an exemplary embodiment of the invention.

FIG. 5 shows a cross-sectional view of a first valve component, formed as a rotor device 102, of a fluid valve 95 according to an exemplary embodiment of the invention.

FIG. 5 shows how two rotor elements 122, 124 of the first valve component 102 form an integral, single-piece body after they have been fastened to one another by means of ultrasound and/or thermocompression bonding.

In the case of the fluid valve 95 as per FIG. 5, the contact face 108 (which interacts in fluid-tight fashion with a second valve component 104 that is not shown in FIG. 5) of the rotor device 102 is, as another part of an in this case inner surface of the rotor device 102, situated opposite a parallel counterpart face 183 with a fluid structure 166. The counterpart face 183 delimits the rotor element 102 and, at this, bears against the rotor element 124. Both the fluid structures 166 and the counterpart face 183 are provided with a coating 110 containing gold and/or platinum.

The counterpart face 183 of the rotor element 122 is, at the coating 110, thermobonded and/or ultrasound-bonded to a covering body in the form of the rotor element 124. The ability of the rotor elements 122, 124 to be non-separably connected to one another by means of thermobonding (that is to say pressing together in the presence of elevated temperature and/or elevated introduction of energy) and/or ultrasound bonding (that is to say bonding by means of a supply of ultrasound) is greatly increased by means of the coating 110 containing gold and/or platinum. The pressure stability of the fluid valve 95 is thereby also increased.

By virtue of the walls of the rotor element 122 which delimit the fluid structures 166, and consequently also a part of the fluid lines 106, being covered with the coating 110 containing gold and/or platinum, biocompatible fluid lines 106 are provided. These permit transportation of even aggressive fluids (for example solvents or biological liquids) without the fluid valve 95 or the fluids being damaged or impaired. Also, with such a coating 110 composed of the inert noble metal gold, corrosion of the fluid valve 95 is greatly suppressed.

Figure 6:
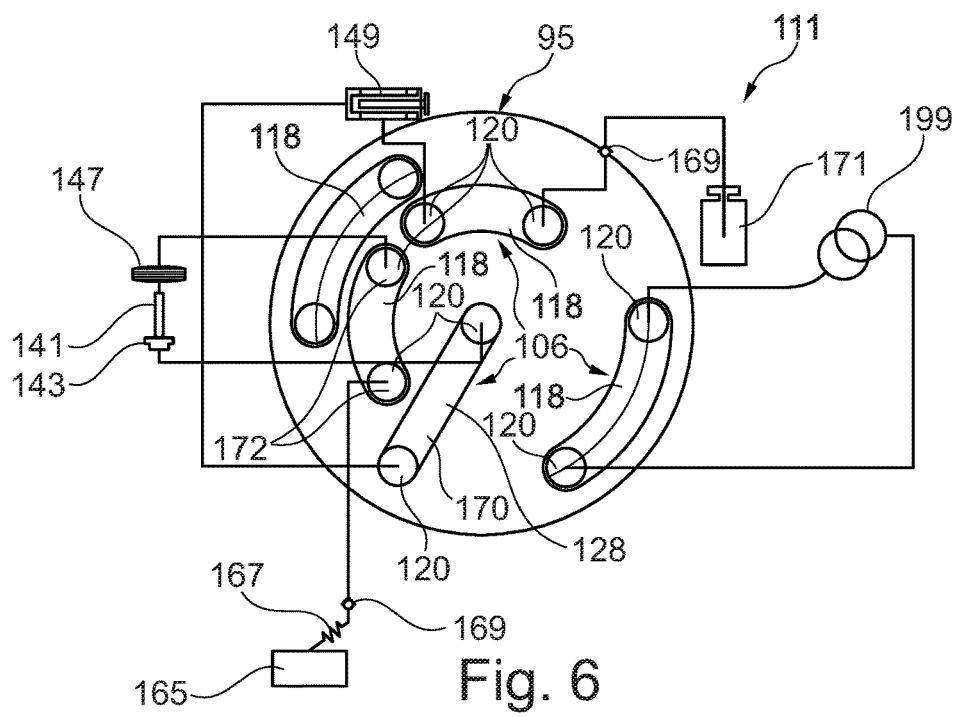
FIG. 6 shows a fluid processing device having a fluid valve according to an exemplary embodiment of the invention.

FIG. 6 shows a fluid processing apparatus 111 with a fluid valve 95 according to an exemplary embodiment of the invention.

A needle 141 is arranged in a seat 143 and can be moved out of the latter (not shown) in order to draw a fluid sample out of a sample vessel (not shown) and, after moving back into the seat 143, to inject said fluid sample via the fluid valve 95 into a fluidic path with a fluidic reactor 199. As the sample is drawn in by the needle 141, the sample can be temporarily stored in a temporary storage volume 147, a so-called sample loop. The drawing-in of the sample may be realized by means of a metering pump 149. A piston thereof can, for the drawing-in process, be moved backward in a piston chamber and, for the injection process, move forward. Also shown in FIG. 6 are a waste 165, a fluidic restriction 167, check valves 169 and a liquid vessel 171. To operate the fluid processing apparatus 111, the fluid valve 95 is provided with grooves 118 and fluid connections 120, which are arranged in different planes in a rotor device 102 and/or in a stator device 104. In particular, a line portion 128, as part 170 of fluid lines 106, is offset downward in relation to a plane of the paper in FIG. 6, whereas another part 172 of the fluid lines 106 may also run in the plane of the paper of FIG. 6. By virtue of in particular the radially running groove corresponding to line portion 128 being arranged in a different axial plane than the fluid connections 120 as per part 172 (and than the tangential grooves 118 between the fluid connections 120), rotary switching of the fluid valve 95 is made possible without the line portion 128 as per the part 170 being undesirably temporarily fluidically coupled to the fluid connections 120 as per the other part 172 in the process.

FIG. 7 to FIG. 10 show grooves 118, formed as functional fluid components, of a rotor device 102 of a fluid valve 95 according to an exemplary embodiment of the invention. FIG. 7 to FIG. 10 show the additional fluidic functions that a groove 118 that may be arranged in a main surface, averted from the stator device 104, of the rotor device 102 can perform. By means of a corresponding fluid channel 106, it is for example possible for at least one function to be provided from a group comprising a fluidic restriction, a fluidic retarding device for retarding a fluid flow, a temporary storage volume for temporarily storing a predefined fluid quantity, and a fluidic mixing device, etc.

Figure 7:
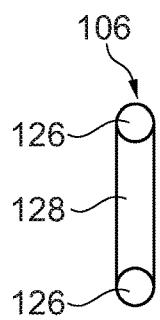
FIG. 7 shows an example of grooves, formed as functional fluid components, of a rotor device of a fluid valve according to an exemplary embodiment of the invention.
Figure 8:
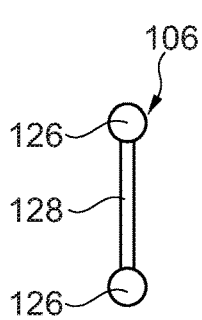
FIG. 8 shows another example of grooves, formed as functional fluid components, of a rotor device of a fluid valve according to an exemplary embodiment of the invention.
Figure 9:
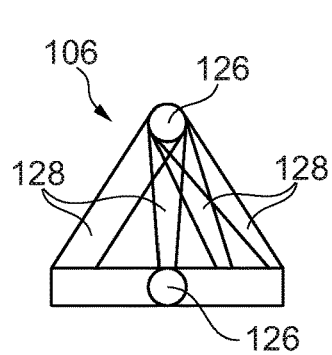
FIG. 9 shows another example of grooves, formed as functional fluid components, of a rotor device of a fluid valve according to an exemplary embodiment of the invention.
Figure 10:
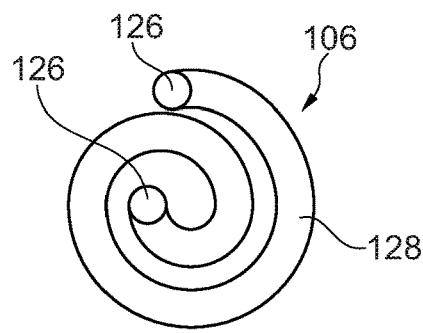
FIG. 10 shows another example of grooves, formed as functional fluid components, of a rotor device of a fluid valve according to an exemplary embodiment of the invention.

In FIG. 7, a fluidic temporary storage volume is provided. A fluidic restriction by means of a locally reduced groove diameter is illustrated in FIG. 8. In FIG. 9, a mixing device is provided which provides, between two fluid connections 126, multiple fluidic paths of different diameter and different length in order that different fluid portions coupled into the different paths can be mixed with different propagation times. In FIG. 10, a fluidic retarding device is provided, because the path between the two fluid connections 126 is, by means of a spiral-shaped groove, artificially lengthened in relation to a linear direct connection.

Figure 11:
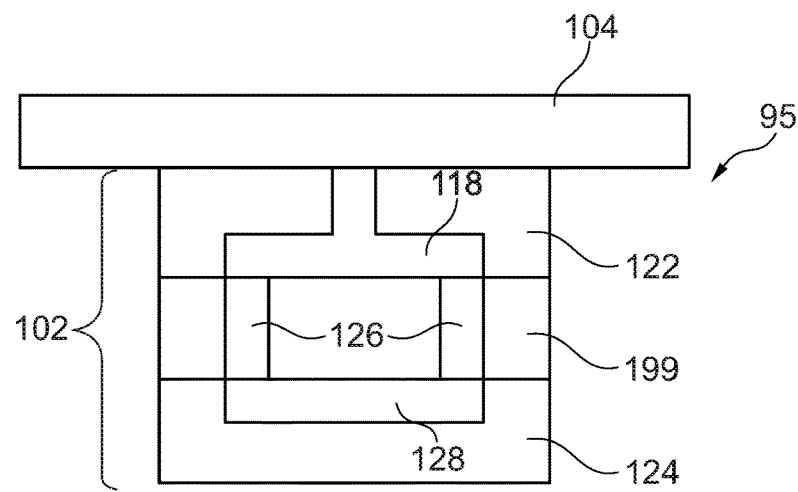
FIG. 11 shows a cross-sectional view of a three-layer fluid valve according to an exemplary embodiment of the invention.

FIG. 11 shows a cross-sectional view of a fluid valve 95 according to an exemplary embodiment of the invention.

FIG. 11 illustrates that a rotor device 102 may also be formed by more than two rotor elements 122, 124 (in this case by three bonded rotor elements 122, 124, 199). Additionally, in FIG. 11, a third rotor element 199 is provided, which permits the formation of even more complex fluidic structures.

Figure 12:
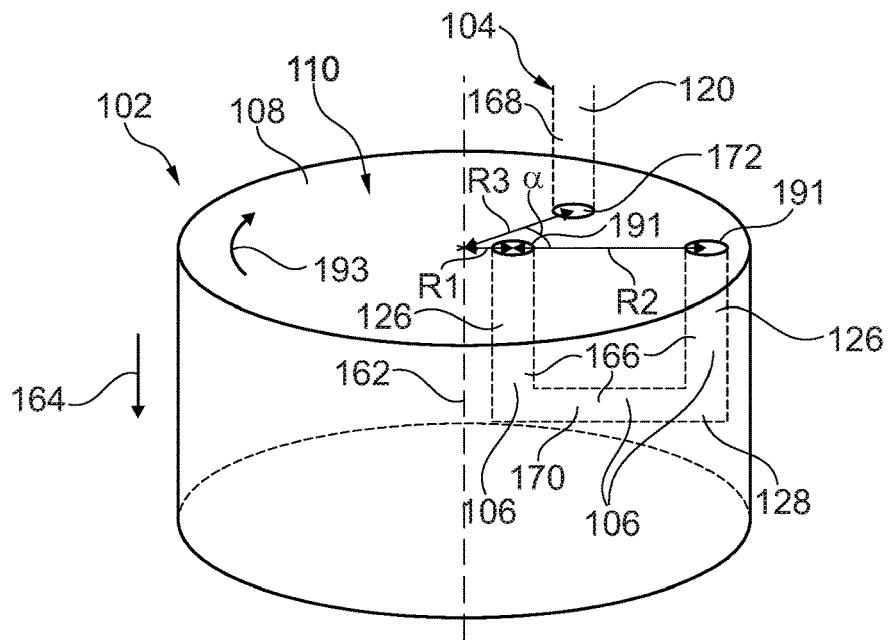
FIG. 12 shows a three-dimensional view of a rotor device and of a part of a stator device of a fluid valve according to an exemplary embodiment of the invention.

FIG. 12 shows a three-dimensional view of a rotor device 102 and a part of a stator device 104 of a fluid valve 95 according to an exemplary embodiment of the invention.

The fluid valve 95 illustrated in FIG. 12 is likewise designed for operation with a sample separation apparatus 10 and comprises a rotor device 102, illustrated in detail, with fluid structures 166. Illustrated only partially and schematically is a stator device 104, which cooperates with the rotor device 102 and which has fluid structures 168, of which only one fluid connection 120 is shown in FIG. 12. As in the exemplary embodiments described above, the rotor device 102 and the stator device 104 are coupled to one another in fluid-tight fashion at corresponding contact faces 108, and are rotatable relative to one another about an axis of rotation 162 (see rotation arrow 193). Although not illustrated in detail in FIG. 12, it is possible in certain states of rotation for a fluid channel 106 that runs through the contact face 108 to be formed by means of the fluid structures 166, 168. The fluid structures 168 of the stator device 104 that are used for this purpose, specifically further fluid connections 120 which are brought into overlap with outlet openings 191 (at radius R1 and R2) of the fluid structures 166 of the rotor device 102 on the contact face 108, are not illustrated in FIG. 12.

One part 170 of the fluid structures 166 of the rotor device 102 is offset with respect to the contact face 108 in an axial direction 164 with respect to the axis of rotation 162, such that, in at least one state of rotation of the fluid valve 95, said part 170 and another part 172 of the fluid structures 168 of the stator device 104 (specifically the fluid port 120 at radius R3 illustrated in FIG. 12) overlap, or are even aligned, in a view along the axial direction 164. This is the case when, in relation to the illustration as per FIG. 12, the rotor device 102 and the stator device 104 have been rotated relative to one another through an angle α. In the latter state of rotation, the part 170 and the other part 172 overlap, or are in alignment, in a view along the axial direction 164, without being fluidically coupled to one another.

Although not illustrated in FIG. 12, the leadthrough of the fluid structures 166 of the rotor device 102 along an interior of the rotor device 102 also makes it possible for the other part 172 to be formed by means of multiple fluid connections 120 of the stator device 104, which may be arranged at at least two different radii in relation to the axis of rotation 162. A configuration with fluid connections 120 at different radii is illustrated for example in FIG. 6.

In FIG. 12, the part 170 extends from a first radius R1 to a second radius R2 of the rotor device 102. The other part 172 is arranged on a third radius R3 which is greater than the first radius R1 and smaller than the second radius R2. The radii R1, R2, R3 are all related to the axis of rotation 162.

As in FIG. 5, it is also possible in FIG. 12 for one part 170 to be formed by a groove 118 in a first rotor element 122 of the rotor device 102, which groove 118 is covered by a second rotor element 124. In this way, it is possible with little outlay in terms of production for a capillary or fluidic path to be formed which, in the interior of the rotor device 102, is delimited over its full periphery by material of the rotor device 102.

The axially offset part 170 of the fluid structures 166 may extend in a radial direction of the rotor device 102, and nevertheless does not restrict the design freedom with regard to providing fluid connections 120 of the stator device 104 at all desired radii. In this way, irrespective of the extent of the part 170 over a large radial region, provision and free movement of the rotor device 102 along fluid connections 120 on the stator device 104 which can be applied in any desired manner is possible without undesired fluidic coupling temporarily occurring between the illustrated fluid structures 166 and 168 during switching.

At least one part of the contact face 108 of at least one of the rotor device 102 and the stator device 104 may also, as per FIG. 12, be provided with a coating 110, as described with reference to FIG. 2 to FIG. 5.

Figure 14:
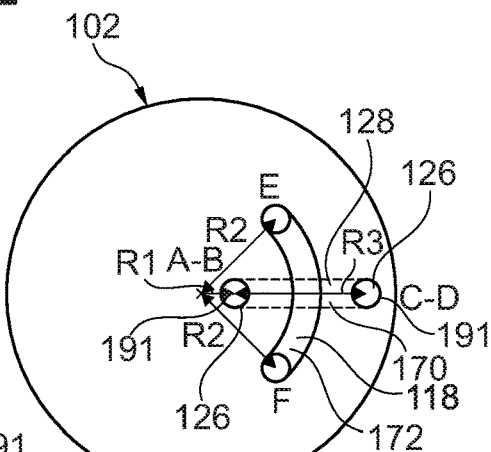
FIG. 14 shows a plan view of the rotor device as per FIG. 13.
Figure 13:
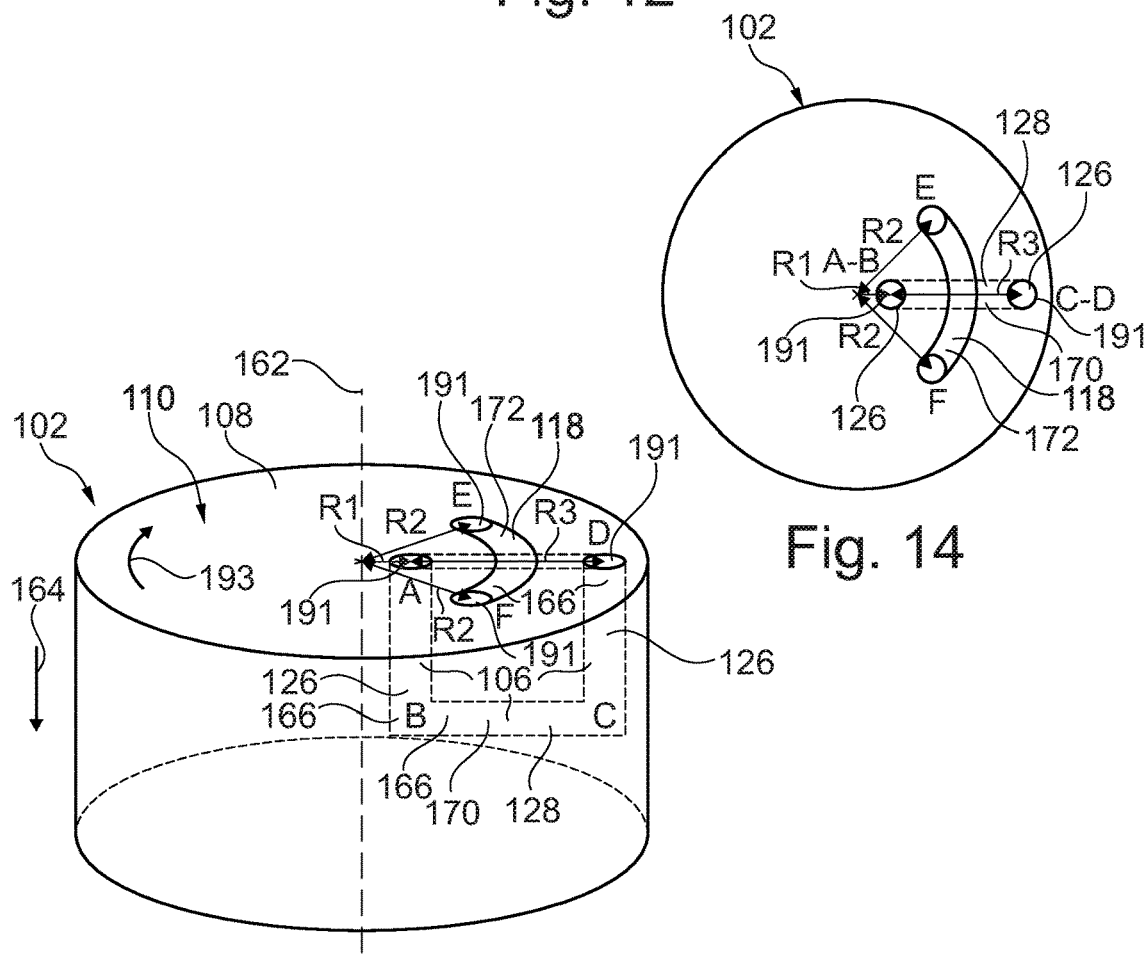
FIG. 13 shows a three-dimensional view of a rotor device of a fluid valve according to another exemplary embodiment of the invention.

FIG. 13 shows a three-dimensional view of a rotor device 102 of a fluid valve 95 according to another exemplary embodiment of the invention. FIG. 14 shows a plan view of the rotor device 102 as per FIG. 13.

In the case of the fluid valve 95 as per FIG. 13 and FIG. 14, the other part 172 also belongs to the fluid structures 166 of the rotor device 102. The other part 172 is furthermore offset in relation to the part 170 of the fluid structures 166 of the rotor device 102 in an axial direction 164, related to the axis of rotation 162, relative to the contact face 108. More specifically, the other part 172 of the fluid structures 166 is arranged on the contact face 108 and in the plane of the paper in FIG. 14. The part 170 is formed as a radially running portion of one of the fluid structures 166, which is arranged below the plane of the paper in FIG. 14. The other part 172 is formed as a circular ring segment of another of the fluid structures 166. More specifically, in FIG. 13 and FIG. 14, the other part 172 of the fluid structures 166 is a groove 118 of the rotor device 102 on the contact face 108. The fluid structures 166 of the rotor device 102 furthermore have two mutually parallel passages 126, which extend in the axial direction 164, through the rotor device 102 from the contact face 108 to the part 170. The passages 126 and the part 170 thus form a substantially U-shaped bypass for the at least one other part 172, which is fluidically decoupled from the part 170. In this way, it is made possible for a first fluid to flow through the part 170, whilst a second fluid flows, independently thereof, through the other part 172. The associated fluidic channels are accommodated in an extremely small space and permit a compact design.

The axially offset part 170 of the fluid structures 166 may extend in a radial direction of the rotor device 102, and nevertheless does not restrict the design freedom with regard to providing the other part 172 of the fluid structures 166 at all desired radii. In this way, irrespective of the extent of the part 170 over a large radial region, it is possible for the other part 172 of the rotor device 102 to be provided along substantially arbitrarily selectable spatial regions without undesired fluidic coupling occurring between the illustrated fluid structures 166 and 168.

At least one part of the contact face 108 of at least one of the rotor device 102 and the stator device 104 may also, as per FIG. 13 and FIG. 14, be provided with a coating 110, as described with reference to FIG. 2 to FIG. 5.

It should be noted that the term "comprising" does not exclude other elements, and that the term "a" does not exclude a plurality. Also, elements that have been described in conjunction with different exemplary embodiments may be combined. It should also be noted that reference designations in the claims are not intended to be interpreted as limiting the scope of protection of the claims.

The invention claimed is:

1. A fluid valve for a sample separation apparatus, the fluid valve comprising:
   a rotor device; and
   a stator device adjacent to the rotor device, wherein:
   the rotor device and the stator device are movable in sliding, rotating contact relative to one another, and are configured such that, in at least one switching state, at least one switchable fluid channel is formed between the rotor device and the stator device;
   the at least one switchable fluid channel is formed from at least one groove in the rotor device and at least two fluid connections on the stator device, wherein, in different switching states, the at least two fluid connections can be placed into different fluidic coupling states with respect to the at least one groove; and
   at least one part of a surface of at least one of the rotor device and the stator device is provided with a coating comprising gold and/or platinum, wherein the coating provides lubrication between the rotor device and the stator device during the sliding, rotating contact.

2. The fluid valve of claim 1, wherein the rotor device comprises a contact face as part of its surface and the stator device comprises a contact face as part of its surface, and the rotor device and the stator device are adjacent to one another at the contact faces.

3. The fluid valve of claim 2, wherein at least one part of the contact face of at least one of the rotor device and the stator device is provided with the coating comprising gold and/or platinum.

4. The fluid valve of claim 3, wherein the coating is formed on the contact face of the rotor device and on the contact face of the stator device.

5. The fluid valve of claim 2, wherein the coating is formed on at least one entire one of the contact faces between the rotor device and the stator device.

6. The fluid valve of claim 2, wherein, situated opposite the contact face of at least one of the rotor device and the stator device, as another part of the surface, there is a counterpart face with at least one fluid structure with a further part of the surface.

7. The fluid valve of claim 6, wherein at least one part of at least one of the fluid structures and/or of the counterpart face is provided with the coating comprising gold and/or platinum.

8. The fluid valve of claim 7, wherein the counterpart face is bonded, at the coating, to a covering body.

9. The fluid valve of claim 2, wherein at least one part of at least one fluid structure of the rotor device is offset in an axial direction with respect to the contact faces, such that, in at least one switching state of the fluid valve, said part and at least one other part of at least one fluid structure of the rotor device and/or of the stator device at least partially overlap in a view along the axial direction.

10. The fluid valve of claim 9, comprising at least one of the following features:
    wherein, in the at least one switching state in which the at least partial overlap occurs, the at least one part and the at least one other part are fluidically decoupled from one another;
    wherein the at least one other part is formed by at least one fluid connection of the stator device;
    wherein the at least one other part of the at least one fluid structure belongs to the rotor device, and is offset in the axial direction with respect to the at least one part of the at least one fluid structure of the rotor device.

11. The fluid valve of claim 1, wherein at least one part of the coating comprises hard gold.

12. The fluid valve of claim 1, wherein at least one part of the coating comprises a composition selected from the group consisting of: cobalt in a range between 0.05 percent by weight and 1 percent by weight, up to 0.7 percent by weight carbon, and the rest gold; and cobalt in a range between 0.2 percent by weight and 0.3 percent by weight, up to 0.7 percent by weight carbon, and the rest gold.

13. The fluid valve of claim 1, comprising at least one of the following features:
    wherein the rotor device and the stator device are provided with different coatings, one of the different coatings being the coating comprising gold and/or platinum;
    wherein the coating comprises multiple layers, a first layer of the coating is formed directly on a main body of the respective rotor device or the stator device, and a second layer is formed on the first layer;
    wherein the coating comprises multiple layers, a first layer of the coating is formed directly on a main body of the respective rotor device or the stator device and comprises pure gold, and a second layer is formed on the first layer and comprises hard gold;
    wherein a main body of at least one of the rotor device or the stator device, on which main body the coating is arranged, comprises metal;
    wherein a main body of at least one of the rotor device or the stator device, on which main body the coating is arranged, comprises steel.

14. The fluid valve of claim 1, wherein the rotor device comprises a first rotor element and a second rotor element, wherein the first rotor element defines at least one part of the at least one switchable fluid channel, and wherein the second rotor element forms a cover of the first rotor element.

15. The fluid valve of claim 14, wherein the first rotor element comprises, as at least one part of a first fluid channel, the at least one groove on one of the two opposite main surfaces of the first rotor element and, as at least one part of a second fluid channel, at least one passage through the first rotor element and another groove, fluidically coupled to said passage, on the other of the two opposite main surfaces of the first rotor element.

16. The fluid valve of claim 1, comprising at least one of the following features:
    wherein the rotor device comprises, as at least one part of a first fluid channel, the at least one groove on a main surface, facing toward the stator device, of the rotor device and, as at least one part of a second fluid channel, at least one passage through at least one part of the rotor device and a line portion fluidically coupled to said passage;
    comprising a sealing element which, for sealing purposes, is arranged between the rotor device and the stator device;
    wherein at least one of the rotor device and the stator device comprises at least one material selected from the group consisting of: a metal, a plastic, a plastic with filler particles, a plastic without filler particles, and a ceramic;
    wherein different fluidic structures are formed in different diameter regions of the rotor device;
    wherein at least one fluidic function out of a group comprising a fluidic restriction, a fluidic retarding device for retarding a fluid flow, a temporary storage volume for temporarily storing a predefined fluid quantity, and a fluidic mixing device is provided by means of the at least one switchable fluid channel.

17. A method for producing a fluid valve for a sample separation apparatus, the method comprising:
   providing a rotor device and a stator device such that the rotor device and the stator device are adjacent to one another and are movable in sliding, rotating contact relative to one another;
   forming the rotor device and the stator device such that:
      in at least one switching state, at least one switchable fluid channel is formed between the rotor device and the stator device; and
      the at least one switchable fluid channel is formed from at least one groove in the rotor device and at least two fluid connections on the stator device, wherein, in different switching states, the at least two fluid connections can be placed into different fluidic coupling states with respect to the at least one groove; and
   providing at least one part of a surface of at least one of the rotor device and the stator device with a coating comprising gold and/or platinum, wherein the coating provides lubrication between the rotor device and the stator device during the sliding, rotating contact.

18. A fluid valve for a sample separation apparatus, the fluid valve comprising:
   a rotor device comprising a rotor contact face and at least one groove;
   a stator device comprising a stator contact face adjacent to the rotor contact face and at least two fluid connections, wherein:
      the rotor device and the stator device are movable in sliding, rotating contact relative to one another at the rotor contact face and the stator contact face, and are configured such that, in at least one switching state, at least one switchable fluid channel is formed between the rotor device and the stator device; and
      the at least one switchable fluid channel is formed from the at least one groove of the rotor device and at least two fluid connections of the stator device, wherein, in different switching states, the at least two fluid connections can be placed into different fluidic coupling states with respect to the at least one groove; and
   a coating comprising gold and/or platinum disposed on the rotor contact face and further disposed in the at least one groove,
   wherein the coating provides lubrication between the rotor device and the stator device during the sliding, rotating contact.

19. The fluid valve of claim 18, wherein the coating disposed on the rotor contact face and in the at least one groove is a first coating, and further comprising a second coating disposed on the stator contact face, wherein the second coating comprises one or more of the following materials: gold; platinum; diamond-like carbon (DLC); diamond.

20. The fluid valve of claim 19, wherein the second coating is further disposed in the at least two fluid connections.

* * * * *